United States Patent
Herzbach et al.

(10) Patent No.: US 6,799,438 B2
(45) Date of Patent: Oct. 5, 2004

(54) METHOD FOR MAKING A MICROSTRUCTURE IN A GLASS OR PLASTIC SUBSTRATE ACCORDING TO HOT-FORMING TECHNOLOGY AND ASSOCIATED FORMING TOOL

(75) Inventors: Lars Christian Herzbach, Weiterstadt (DE); Steffen Thiel, Woerrstadt (DE); Stefan Postrach, Mainz (DE)

(73) Assignee: Schott Glas, Mainz (DE)

( * ) Notice: Subject to any disclaimer, the term of this patent is extended or adjusted under 35 U.S.C. 154(b) by 129 days.

(21) Appl. No.: 09/902,316

(22) Filed: Jul. 10, 2001

(65) Prior Publication Data

US 2002/0035854 A1 Mar. 28, 2002

(30) Foreign Application Priority Data

Jul. 15, 2000 (DE) .......................................... 100 34 507

(51) Int. Cl.⁷ .............................................. C03B 40/04
(52) U.S. Cl. .............................. 65/25.3; 65/25.4; 65/93; 65/106; 65/169; 65/182.2; 65/255; 65/263; 65/370.1; 425/385; 425/388; 425/405.1; 425/437; 425/470; 425/471
(58) Field of Search ................................. 65/25.1–25.4, 65/81, 93, 94, 106, 168–170, 182.2, 255, 263, 273, 370.1; 425/385, 388, 405.1, 437, 470, 471, DIG. 119

(56) References Cited

U.S. PATENT DOCUMENTS

| | | | | |
|---|---|---|---|---|
| 798,642 A | * | 9/1905 | Wadsworth | .................... 65/81 |
| 907,656 A | * | 12/1908 | Wadsworth | .................... 65/185 |
| 1,589,654 A | | 6/1926 | Murdock | |
| 2,352,957 A | | 7/1944 | Kell | |
| 2,632,227 A | * | 3/1953 | Steel et al. | .................... 264/86 |
| 3,231,356 A | | 1/1966 | Giffen | |
| 3,961,927 A | * | 6/1976 | Alderson et al. | ............ 65/25.1 |
| 4,413,966 A | * | 11/1983 | Mills et al. | .................... 425/84 |
| 4,670,283 A | * | 6/1987 | Cattani | ........................ 426/512 |
| 4,985,186 A | * | 1/1991 | Nose et al. | .................... 264/1.7 |
| 5,069,609 A | * | 12/1991 | Ito et al. | ........................ 425/84 |
| 5,427,599 A | * | 6/1995 | Greschner et al. | ............ 65/305 |
| 5,762,673 A | * | 6/1998 | Hirota et al. | ................. 65/25.1 |
| 5,873,921 A | * | 2/1999 | Hirota et al. | ................. 65/25.1 |
| 6,128,925 A | * | 10/2000 | Ostendarp et al. | ............ 65/171 |

FOREIGN PATENT DOCUMENTS

| | | |
|---|---|---|
| DE | 109 110 C | 11/1898 |
| DE | 197 13 312 A | 10/1998 |
| GB | 972 727 A | 10/1964 |
| JP | 61-121915 | * 6/1986 |

* cited by examiner

*Primary Examiner*—Sean Vincent
(74) *Attorney, Agent, or Firm*—Michael J. Striker

(57) ABSTRACT

A microstructure is formed in a viscous glass or plastic substrate by pressing a structured surface of a forming tool corresponding to a negative of the microstructure to be produced in the viscous glass or plastic substrate. After the microstructure has been formed, the forming tool is removed from the surface. In order to help form the microstructure and remove the forming tool from the substrate the forming tool has an at least partially porous base body (1) and an operative layer (2) structured with a negative structure consisting of grooves (11) extending to the porous base body (1). The forming of the microstructure in the substrate is assisted by applying suction to the porous base body (1) so that the grooves (11) fill more easily and completely with melted glass or plastic material. The removal of the forming tool after forming the microstructure is assisted by applying an overpressure to the porous body to help release the solidified glass or plastic material from the forming tool.

9 Claims, 2 Drawing Sheets

FORMING TOOL

CHANNEL PLATE

METHOD FOR MAKING A MICROSTRUCTURE IN A GLASS OR PLASTIC SUBSTRATE ACCORDING TO HOT-FORMING TECHNOLOGY AND ASSOCIATED FORMING TOOL

BACKGROUND OF THE INVENTION

1. Field of the Invention

The present invention relates to a method of making a microstructure in a glass or plastic substrate according to hot-forming or hot-shaping technology, in which the microstructure is formed in viscous glass or plastic by pressing a forming tool, whose surface is structured according to a negative of the microstructure to be made, into the glass or plastic substrate and then removing the forming tool from it after completing the structuring. The invention also relates to the forming tool used to make this sort of microstructure according to hot-forming technology.

2. Related Art

Glass or plastic substrates, whose surfaces have a microstructure, are required in certain new engineering fields. For example, plate glass for precision applications provided with a microstructure of even higher precision is employed, especially in display devices, illuminating systems and in optical and medical engineering applications and in sensor technology. Display panels for newer flat screen technology are of special significance (PDP=plasma display panels or PALC=plasma addressed liquid crystal).

Microchannel structures in the form of several parallel channels are produced in these so-called channel plates.

This sort of channel plate is illustrated in the detailed view shown in FIG. 6. The channel-shaped microstructure appearing in this figure is economical and is used in large-scale manufacture of different sized displays (display screen diagonals up to 55"). The structure dimensions are in the following ranges independently of the screen format: pitch X"=150 to 650 $\mu$m; height Y=100 to 250 $\mu$m; and width Z=20 to 50 $\mu$m. For example, about 5760 channels with a spacing of "X", the so-called pitch, of about 161 $\mu$m, a height "Y" of 150 $\mu$m and a width "Z" of 30 $\mu$m with tolerances of a few $\mu$m over a length of about 520 mm are made for a 42" HiVision PDP display.

The problems with other engineering applications are similar.

Different methods for forming a microstructure are known. In one method the walls are applied to the substrate in several layers one after the other in a screen-printing process. This process requires a considerable effort and is expensive.

In another method the substrate surface is structured by a sand blasting or grinding method. In the grinding method a high-precision multi-disk grinding module is employed, which has a plurality of high precision grinding disks mounted on a common spindle spaced axially from each other by spacing rings.

Forming a microstructure in plasticized glass or plastic by a so-called hot forming method by means of a forming tool with a suitably structured surface is also known. This can be performed both in the glass material directly from the melt or plastic, the so-called prototype hot forming process, and in the conversion hot forming process with a solid substrate, as is described in DE 197 13 312 A1, in which a local heating of the structuring surface of the forming tool for melting the substrate surface is performed immediately prior to the shaping process.

The surface of the forming tool must be shaped according to the negative of the predetermined structure to be formed in the substrate in order to be able to form that structure in the substrate. The negative surface structure corresponding to the channel structure of FIG. 6 is illustrated in FIG. 5 for the described embodiment of a PALC channel plate.

During the forming process the low viscosity glass (or plastic) adapts itself to the structure of the forming tool. The selection of the forming tool used for this purpose is a matter of compromise. The wetting of the melted liquid phase on the forming tool must be great enough so that the glass or the plastic is as completely forced into the structured surface on the forming tool in operation as possible. On the other hand, the glass or the plastic to be structured must be able to separate again from the forming tool material after formation of the desired $\mu$m-scale structure i.e. the wetting should thus be poor. In practice materials that have very good wetting behavior produce good $\mu$m-scale structures, but the adhesion experienced during separation causes breakage of the formed structures.

The required $\mu$m-geometry of the formed structures is poor when the wetting of the materials is poor. On the other hand, the probability of breaking the formed $\mu$m-structures on separation is minimal.

Up to now it has not been possible to find a combination of materials, which satisfy the above-described requirements in an optimum manner, i.e. that is which guarantee that the negatively structured surface on the forming tool is completely filled when the forming tool is pressed into the substrate and that the structure produced is not broken when the forming tool is withdrawn from the structure, i.e. on shaping of the structure.

SUMMARY OF THE INVENTION

It is an object of the present invention to provide a method of making a microstructure in a glass or plastic substrate of the above-described type, in which the negatively structured surface of the forming tool fills with melted glass or plastic as completely as possible during formation of the microstructure with the forming tool, and in which the formed structure is not damaged when the forming tool is removed from the substrate.

This object and others, which will be made more apparent hereinafter, are attained in a method of making a microstructure in a glass or plastic surface by hot-forming technology comprising structuring the forming tool surface according to the negative of the microstructure to be produced; pressing the forming tool surface structured during the structuring into a viscous glass or a viscous plastic substrate and then, after the structuring, removing the forming tool from the structured glass or plastic surface.

The forming tool used in the method according to the invention is provided with an at least partially porous base material with an open pore structure, which acts on the structure during formation of it with an under-pressure and during removal of the forming tool from it with an overpressure.

The forming tool according to the invention for making a microstructure in a glass or plastic surface by hot-forming technology comprises a base body, an operative layer applied to a surface on one side of the base body and means for supplying or withdrawing air from another surface on an opposite side of the base body. The base body comprises a porous base material with an open pore structure and the operative layer comprises a gas-impermeable material structured according to a negative of the microstructure to be produced by the forming tool in order to form depressions or grooves that extend through the operative layer to the base material with the open pore structure.

Thus an under-pressure or overpressure is produced in the depressions or grooves of the negative structure of the forming tool in the method according to the invention, since air is drawn through or forced through the bottom of the depressions or grooves.

The sucking or drawing of air, the low pressure or under-pressure in the grooves or depressions, helps the process of filling the grooves or depressions with glass or plastic material. In contrast the blowing or forcing of air through the bottom of the depressions or grooves assists in the removal of the forming tool from the glass or plastic substrate.

According to a preferred embodiment of the method the viscous glass or plastic substrate is taken directly from a melt of the glass or plastic material.

According to an alternative preferred embodiment of the method a solid glass or plastic substrate is provided and prior to forming the microstructure the solid glass or plastic substrate is heated locally in order to plasticize the substrate in the region in which the microstructure is to be formed.

In the case of the second alternative of course additional energy for melting of the glass or plastic material is required when the substrate is present in solid form, however the simpler handling of the substrate material and independence from a melt are perceived as advantageous in certain applications.

In some embodiments of the forming tool the entire base body consists of a porous material with an open pore structure.

Alternatively for greater efficiency and technical operability, the forming tool can be formed so that only a portion of the base body adjacent or next to the operative layer consists of porous base material with an open pore structure, while the remaining portion is gas-impermeable.

According to another feature of the preferred embodiments of the invention the side walls of the porous base body are gas-impermeable. Because of that feature the full under-pressure or overpressure is provided in the depressions or grooves in the negative structure of the forming tool, i.e. only acts in the depressions or grooves, so that the forming of the microstructure in the substrate and the removal of the forming tool from it are optimized.

Advantageously the forming tool is a press roller or press tool according to the particular application.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
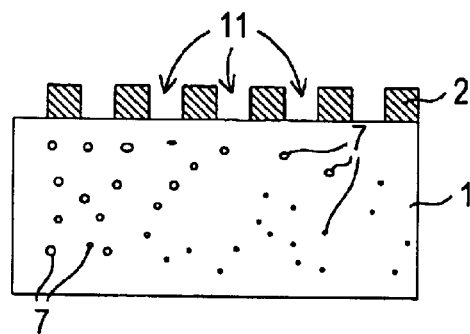
FIG. 1 is a schematic and idealized longitudinal cross-sectional view through a first embodiment of a forming tool according to the invention having a porous base material, which forms the entire base body of the forming tool and a structured operative layer applied to the base body.

The basic structure of the forming tool according to the invention is shown in the cross-sectional view provided in FIG. 1. The embodiment of the forming tool shown in FIG. 1 comprises a base body 1 made of a porous base material provided with an open pore structure comprising a plurality of open pores 7, so that the base body 1 is air-permeable or gas-permeable. This open pore structure can be provided e.g. by a sintering process. The porous base material can be metallic or preferably ceramic in nature.

The principle different forming tool shapes used in the method are not shown. Rotationally symmetric rolls and planar pressing tools, dies or molds are typically used in this type of hot forming method. Only the positioning/clamping of the forming tool for the structuring is adjusted to their form.

Figure 5:
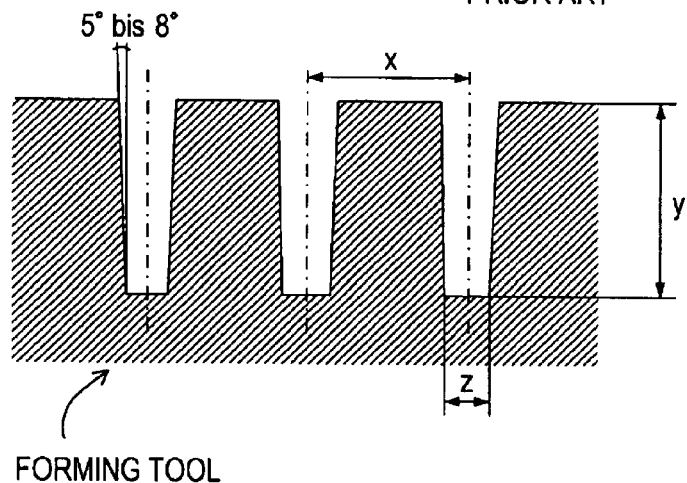
FIG. 5 is a cross-sectional view through a known forming tool having an operative layer of known structure which is the negative of a corresponding structure to be formed in a channel plate.
Figure 6:
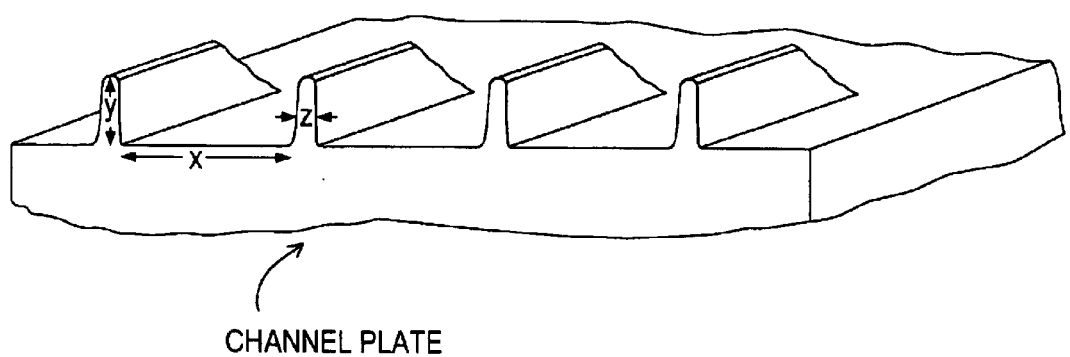
FIG. 6 is a perspective view of an embodiment of this known channel plate.

The operative layer 2, i.e. the structured surface of the forming tool, is applied to the base body 1. The operative layer 2 is not porous or does not have an open pore structure. The structuring is shown symbolically by the rectangular contour. This structure has a shape corresponding to that described already in FIG. 5 for structuring glass substrates for channel plates according to FIG. 6.

The material for the operative layer can be a high-temperature alloy based on Fe, Ni and Co, for example, Inconel xx, Incoloy xx, Nicrofer xx, Nimonic xx, Udimet xx, PM 1000, PM 2000, Deloro alloys xx, Stellite xx, Tribaloy xx, Hastelloy xx and Haynes xx; a ceramic material, such as $Si_3N_4$, SiC, $SiO_2$, $Al_2O_3$, $ZrO_2$, $B_4C$, BN, BCN, WC, TiC, TiN, $Ti_2N$, $TiB_2$, TiCN, TiAlN, AlN, AlON, CrN, CrON, ZrN and TaC; a noble metal or alloy (Pt, Au, Ir, Rh, Os, Ru, Re) or a refractory metal (W, Hf, Ta, Hb, Mo).

The application of the operative layer, or its negative microstructuring, can occur according to different manufacturing processes. The resulting structure should fulfill the following main requirements in relation to the structuring process:

an exact geometric negative mapping or representation of the required structure to be formed (large-surface $\leq 1$ $m^2$), high flatness or planarity and reduced roughness of the tool surfaces (avoids the formation of roughness on the glass or plastic substrate), smooth side or flank surfaces without undercutting (guarantees the removability).

The following methods fulfill the main requirements and are preferred for structuring the tool.

Spark discharge machining: the processing of large-surface tools is possible with the strip erosion technology. The structuring of the tool produces disk and pin electrodes.

Grinding methods: the working of the tool occurs with suitably structured grinding disks.

Micromachining: diamond machining tools are used for working, but the materials that can be worked by them are very limited (high temperature-resistant alloys are unsuitable for machining).

Laser processing: The structures can be produced in the forming tool by using an extremely short laser pulse in the femtosecond range.

Also other method which fulfill the above-described requirements may be considered.

The porous forming tool provided with the structured operative layer may be used during the hot forming process according to the method that is described hereinbelow.

Figure 2:
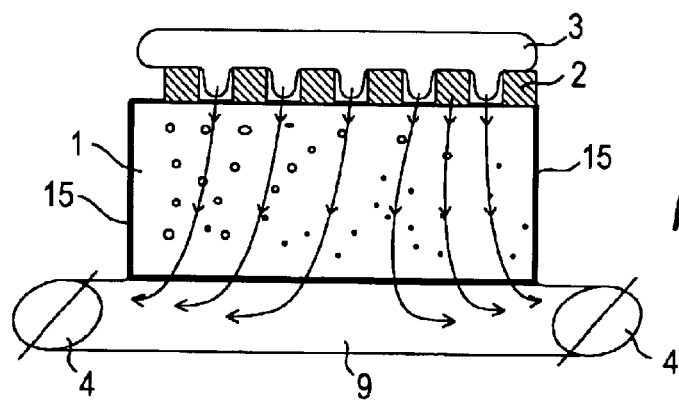
FIG. 2 is a schematic and idealized longitudinal cross-sectional view through the forming tool shown in FIG. 1 with a part of a pump apparatus in which the forming tool is shown in a state being applied to a substrate to form the structured surface, assisted by application of a low pressure in the depressions formed in the structured operative layer.
Figure 3:
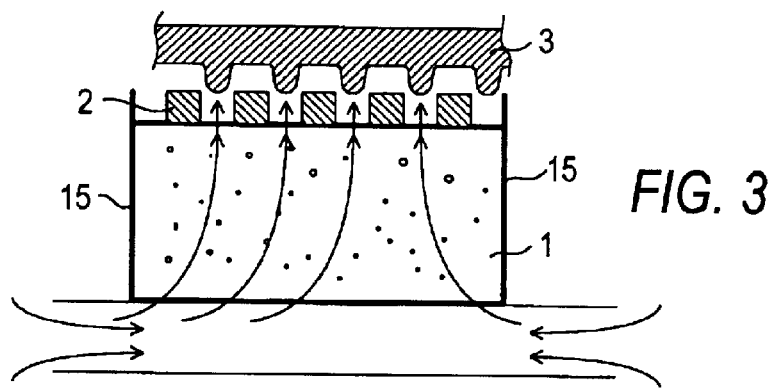
FIG. 3 is a schematic and idealized longitudinal cross-sectional view through the forming tool and pump apparatus shown in FIG. 2, which shows the state of the forming tool during removal from the structure, assisted by application of an overpressure in the depressions formed in the structured operative layer.

Air is drawn through the open pores of the forming tool during the formation of the μm-structures when the forming tool is pressed in the viscous glass or plastic material, so that an under pressure or partial vacuum is produced at the boundary surface on the glass or plastic in the gaps or spaces (grooves or depressions 11) between the structured walls. The glass-plastic melt 3 is drawn or pulled into the grooves or depressions 11, because of the sucking action and that assists in the structuring. This step of the method according to the invention is shown in FIG. 2. At least one, preferably two pumps 4 are connected to a chamber or space 9 adjacent to the porous base body 1 in order to provide the required under pressure. The side walls 15 of the base body not connected with the pumps 4 are sealed so that they are gas-tight, so that the under pressure, i.e. the sucking action, can be completely effective in the grooves 11. After formation of the structures in the solidifying melt 3 gas (air) is conducted through the open pores 7 of the forming tool on the boundary surface to the glass or plastic material. The process simplifies the removal, i.e. the release of the glass or plastic substrate from the forming tool. This step is shown in FIG. 3. Pressurized air is forced through the porous base body 1, or into the chamber next to it, as indicated by the arrows in FIG. 3. The side walls 15 of the forming tool, as noted above, are sealed so that they are gas-tight.

Figure 4:
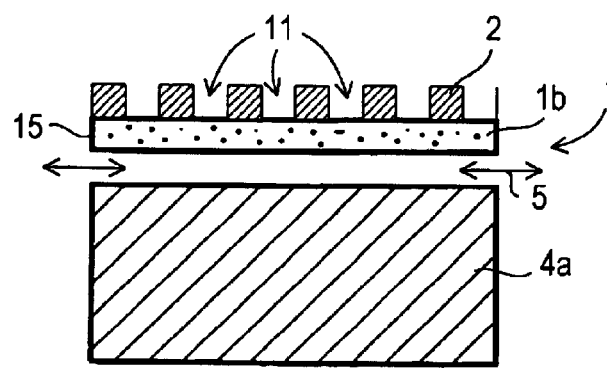
FIG. 4 is a schematic and idealized longitudinal cross-sectional view through a second embodiment of a forming tool according to the invention, in which only part of the base body comprises a porous base material.

An embodiment of the forming tool is shown in FIG. 4 in which the base body 1 is not completely made of porous material, as in the embodiment of FIGS. 1 to 3. Instead the base body 1 in the embodiment of FIG. 4 is only partially made of porous base material. The base material comprises a non-porous material 1a and a porous layer 1b with an open pore structure adjacent to the operative layer 2. An under pressure or an overpressure can be applied to the operative layer 2 by means of the duct 5 provided between the porous layer 1b and the nonporous material 1a, for removal of or for forming by the forming tool, as has already been described in relation to FIGS. 2 and 3.

The "negative structure" of the forming tool or "the structured surface of the forming tool that corresponds to the negative of the microstructure to be formed" means that ideally the surface of the forming tool fits together exactly at all points with the surface of the substrate in the vicinity of the microstructure after its formation so that there are no gaps or spaces between the surface of the forming tool and the surface of the substrate, i.e. the opposing surfaces contact each other at all points. Also, the "negative structure" of the forming tool or "the structured surface of the forming tool that corresponds to the negative of the microstructure to be formed" means that the forming tool surface is formed so that the desired microstructure is formed when the forming tool is pressed into the viscous glass or plastic substrate surface.

The disclosure in German Patent Application 100 34 507.7-45 of Jul. 15, 2000 is incorporated here by reference.

This German Patent Application describes the invention described hereinabove and claimed in the claims appended hereinbelow and provides the basis for a claim of priority for the instant invention under 35 U.S.C. 119.

While the invention has been illustrated and described as embodied in a method of making a microstructure in a glass or plastic substrate according to hot-forming or hot-shaping technology, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A forming tool for making a microstructure in a glass or plastic surface by hot-forming technology, said forming tool comprising a base body, an operative layer applied to a surface on one side of the base body and means for supplying or withdrawing air from another surface on another side of the base body opposite from the one side on which the operative layer is applied, wherein said base body comprises a porous base material with an open pore structure and said operative layer comprises a gas-impermeable material structured according to a negative of the microstructure to be produced by the forming tool in order to form depressions or grooves that extend through the operative layer to the porous base material with the open pore structure.

2. The forming tool as defined in claim 1, wherein said base body consists entirely of said porous base material with the open pore structure.

3. The forming tool as defined in claim 2, wherein said base body has gas impermeable side walls.

4. The forming tool as defined in claim 1, wherein only a portion of said base body next to said operative layer consists of said porous base material with the open pore structure, while a remaining portion of the base body is gas-impermeable.

5. The forming tool as defined in claim 4, wherein said portion of the base body next to said operative layer has gas-impermeable side walls.

6. The forming tool as defined in claim 1, consisting of a pressing roller or a press tool.

7. A method of using a forming tool to make a microstructure in a glass or plastic body by hot-forming technology, said method comprising the steps of:

a) providing the forming tool, said forming tool comprising a base body, an operative layer applied to a surface on one side of the base body and means for supplying or withdrawing air from another surface on another side of the base body opposite from the one side on which the operative layer is applied, said base body comprising, a porous base material with an open pore structure and said operative layer comprising a gas-impermeable material structured according to a negative of the microstructure to be produced by the forming tool in order to form depressions or grooves that extend through the operative layer to the base material with the open pore structure;

b) pressing the operative layer of the forming tool structured according to the negative of the microstructure to be produced into a viscous glass or plastic substrate;

c) during the pressing of step b), generating an under pressure that acts on the open pore structure of the base body in order to draw glass or plastic material of the viscous glass or plastic substrate into the operative layer of the forming tool, and thus help form the microstructure in the viscous glass or plastic substrate;

d) after the microstructure has been formed in the substrate in step c), removing the forming tool from the viscous glass or plastic substrate; and e) during the removing of step d), generating an overpressure that acts on the open pore structure of the base body to assist in the removing.

8. The method as defined in claim 7, further comprising forming the viscous glass or plastic substrate from a glass or plastic melt.

9. The method as defined in claim 7, wherein the glass or plastic substrate is solid, and further comprising heating the forming tool locally immediately prior to formation of the microstructure in the glass or plastic substrate and applying the forming tool heated during the heating to the glass or plastic substrate in a region to be structured to plasticize substrate material and form the microstructure in the viscous glass or plastic substrate.

* * * * *